# United States Patent Office 3,198,806
Patented Aug. 3, 1965

3,198,806
2-ALKOXY-2-OXAZOLINES
George E. Ham, Lake Jackson, Tex., assignor to The Dow Chemical Company, Midland, Mich., a corporation of Delaware
No Drawing. Filed Aug. 7, 1963, Ser. No. 300,643
3 Claims. (Cl. 260—307)

This invention relates to new compounds having the formula

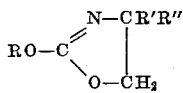

wherein R is an alkyl, aralkyl or cycloalkyl radical and R' and R'' are H, alkyl, cycloalkyl or phenyl radicals.

The compounds of the invention are conveniently prepared by the molecular rearrangement of the corresponding aziridine:

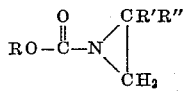

This rearrangement is effected by warming the aziridine with an alkali metal iodide. The reaction is preferably conducted in a suitable solvent at a temperature of about 50 to 150° C. Suitable solvents include acetonitrile, propionitrile, dimethyl formamide, dimethyl sulfoxide and ethylene carbonate.

A convenient general procedure for making the new compounds by rearrangement of the appropriate aziridine consists essentially of dissolving the aziridine in a suitable solvent, such as acetonitrile, adding about 5–20% by weight of alkali metal iodide, heating for at least several hours at about 60–100° C. and separating the product from the reaction mixture. This procedure is illustrated by the following example.

A mixture of 23 g. of ethyl 1-aziridinylformate, 3 g. of NaI and 300 ml. of acetonitrile was refluxed (at about 80° C.) for four days. It was then cooled to −10° C. and filtered. The solvent was removed from the filtrate by distillation under reduced pressure, after which the product was distilled at 40° C./1 mm. Upon redistillation it yielded 10.7 g. (47% conversion) of 2-ethoxy-2-oxazoline, a colorless liquid having the following properties: B.P., 96° C./100 mm.; $n_D^{20}$, 1.4330; $d_{20}$, 1.041; percent C, 53.31; percent H, 7.85 (calcd., C, 52.16; H, 7.88).

When dry HCl was passed into an ether solution of the above product it was converted to ethyl N-(2-chloroethyl) carbamate.

2-ethoxy-2-oxazoline was found to be an effective stabilizer for trichloroethylene when incorporated therein in an amount of about 0.02% by volume.

By use of the above general procedure, other 2-oxazolines are produced from the indicated aziridines as shown in the following table.

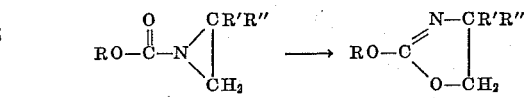

| Aziridine | | | Oxazoline |
|---|---|---|---|
| R | R' | R'' | |
| n-Propyl | H | H | 2-Propoxy-2-oxazoline. |
| n-Butyl | H | CH₃ | 2-Butoxy-4-methyl-2-oxazoline. |
| Benzyl | H | H | 2-Benzyloxy-2-oxazoline. |
| Cyclohexyl | H | H | 2-Cyclohexyloxy-2-oxazoline. |
| sec.-Amyl | H | H | 2-sec.-Amyloxy-2-oxazoline. |
| 2-Phenethyl | H | H | 2-(2-Phenethoxy)-2-oxazoline. |
| Ethyl | CH₃ | C₆H₅ | 2-Ethoxy-4-methyl-4-phenyl-2-oxazoline. |
| Ethyl | Cyclopentyl | Butyl | 2-Ethoxy-4-cyclopentyl-4-butyl-2-oxazoline. |
| Ethyl | Amyl | Amyl | 2-Ethoxy-4,4-diamyl-2-oxazoline. |

The oxazolines listed above are clear liquids having properties and uses similar to those of 2-ethoxy-2-oxazoline. For practical reasons of availablity of materials we prefer the compounds having the above formulas wherein R is a lower alkyl group, i.e., R contains 1 to 8 carbon atoms, and R' and R'' are hydrogen or lower alkyl. Also, it is preferred that any cycloalkyl radicals contain 5 or 6 carbon atoms in the cycloalkyl ring The aziridinylformates used as starting materials are conveniently prepared by the reaction of the appropriate aziridine with the appropriate chloroformate:

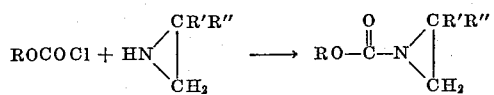

A tertiary amine or other acid acceptor should be used.

The 2-alkoxy-2-oxazolines can be made less conveniently by other methods, as, for instance, by the ring closure by caustic of the appropriate haloalkyl carbamate.

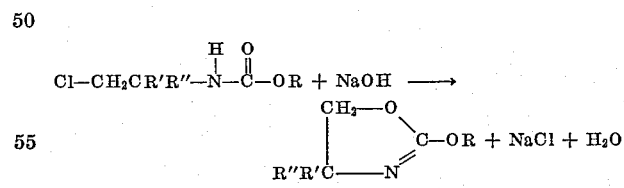

I claim:
1. A compound having the formula

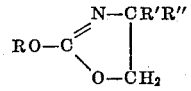

wherein R is a radical selected from the group consisting of alkyl, hydrocarbon aralkyl and cycloalkyl radicals and R' and R" are radicals selected from the group consisting of H, alkyl, cycloalkyl and phenyl radicals and wherein each of the radicals R, R' and R" contains not more than 8 carbon atoms and each cycloalkyl radical contains 5 to 6 carbon atoms in the cycloalkyl ring.

2. A compound having the formula

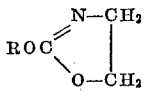

wherein R is a lower alkyl radical.

3. 2-ethoxy-2-oxazoline.

References Cited by the Examiner

Beilsteins Handbuch der Organischen Chemie, vol. 27 (Berlin, 1937), page 94.

Chem. Abstracts, vol. 51, page 1696s (subject Index, J–Z) (1957).

Conant et al.: The Chemistry of Organic Compounds (New York, 1947), pages 342–345.

Lowy et al.: Introduction to Organic Chemistry (New York, 1945), pages 213–215.

Solotorovsky et al.: Chem. Abstracts, vol. 51, page 3821d (1957).

NICHOLAS S. RIZZO, *Primary Examiner.*

WALTER A. MODANCE, *Examiner.*